Aug. 18, 1925.
E. S. HEBELER ET AL
1,549,872
ELECTRIC WELDING APPARATUS
Filed Sept. 19, 1921
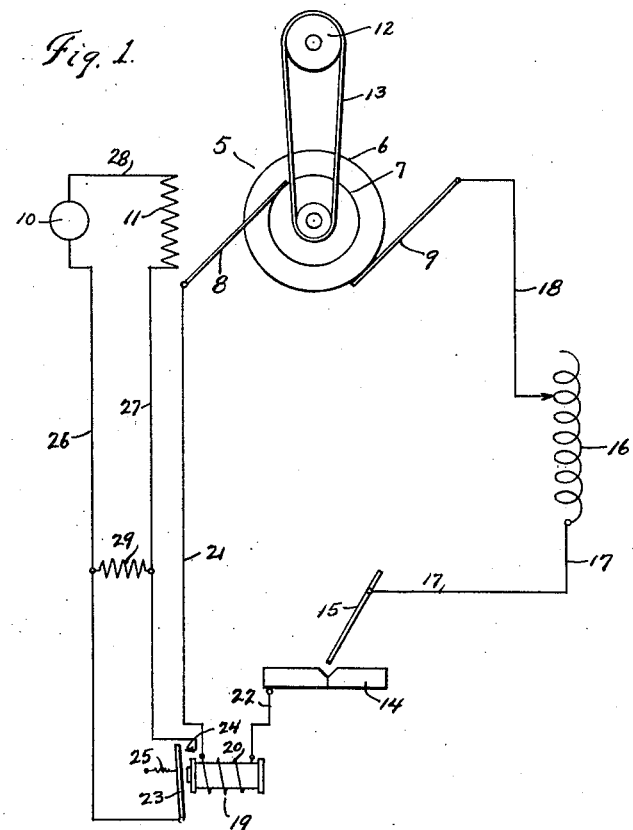
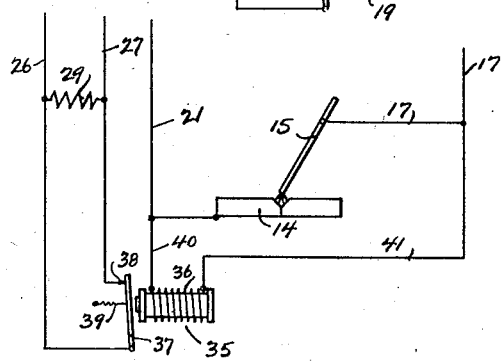
Inventors
Edward S. Hebeler
and Sylvester C. Schulenburg
By
J. W. Ellis
Attorney Patented Aug. 18, 1925.

1,549,872

UNITED STATES PATENT OFFICE.

EDWARD S. HEBELER, OF WILLIAMSVILLE, AND SYLVESTER C. SCHULENBERG, OF FORKS, NEW YORK.

ELECTRIC WELDING APPARATUS.

Application filed September 19, 1921. Serial No. 501,667.

*To all whom it may concern:*

Be it known that we, EDWARD S. HEBELER and SYLVESTER C. SCHULENBERG, citizens of the United States of America, and residents, respectively, of the town of Williamsville, county of Erie, and State of New York, and the town of Forks, county of Erie, and State of New York, have invented certain new and useful Improvements in Electric Welding Apparatus, of which the following is a full, clear, and exact description.

Our invention relates in general to electric welding and more particularly to arc welding.

It is well known to those skilled in the art that at present the source of alternating current used in arc welding is derived from the usual sources of commercial power and the voltage is controlled by means of a transformer. Since it is impractical to change the frequency of the alternating current, it is necessary in most cases to utilize a coated wire for maintaining the arc during the change of polarity of the current. This wire is very much more expensive than ordinary wire, but must be used if a continuous arc is to be maintained. Furthermore, when a transformer is used to supply current of the proper voltage for welding, the power factor of such an installation is very low, and the frequency of the welding current must necessarily be the same as that of the power line.

It is also well known to those skilled in the art that the normal voltage drop across the work-piece should be about twenty volts. This voltage should occur at about the time when the wire is about $\frac{1}{16}''$ away from the work-piece. As the distance between the wire and the work-piece is increased, for instance, by drops of metal leaving the wire, the voltage across the wire and work-piece, must, of course, be increased, so that the arc will be maintained.

The principal object of our invention has been to provide a welding installation having an alternating current generator for supplying the current used in the welding circuit.

Another object has been to provide a generator which shall be capable of taking care of a short circuit across its terminals when starting the welding arc and also capable of taking care of the increased voltage across the terminals when the welding arc is lengthened.

Another object has been to provide a generator which shall produce current of high frequency, whereby the use of coated wire may be obviated.

Another object has been to provide a portable welding installation which may be actuated by any available source of mechanical power, making it possible to weld at remote places where other electric current is not available.

A further object has been to provide automatic means, whereby the voltage of the main welding circuit will be reduced when the welding arc is broken, thus eliminating the possibility of shock to the operator.

The above objects and advantages have been accommplished by the device shown in the accompanying drawings, in which:

Fig. 1 is a diagrammatical view of my complete installation.

Fig. 2 shows a modified form of cut-out switch.

In the drawings, 5 represents the alternating current generator which is designed to produce current of high frequency, such as 65 cycles or over, and to have the other advantages and capabilities above pointed out. The generator is provided with collector rings 6 and 7, and brushes 8 and 9, which contact, respectively, with the rings 6 and 7. A direct current generator 10 is provided for energizing the field 11 of the A. C. generator. This exciting generator is preferably of the compound-wound type and may, if desired, be over compounded so as to give a higher voltage when welding than when not welding. At 12, we have represented in a diagrammatical manner any source of mechanical power for driving the A. C. generator, and this may either be connected directly to the generator or by means of a belt 13.

The work-piece is represented at 14 and the wire used in the welding operation is shown at 15. The wire 15 is connected to the brush 9 through a variable inductance 16, by means of leads 17 and 18. The inductance 16 may, if desired, be made a part of the alternating current generator.

In order that the E. M. F. of the A. C. generator may be reduced to an unharmful voltage when the operator is not welding, we provide a resistance in series with the field of the A. C. generator and control this resistance by means of a cut-out switch. This may be accomplished in a number of ways, two of which are shown in the accompanying drawings. In the form shown in Fig. 1, 19 is the cut-out switch, the winding 20 of which is connected in series with the leads 21 and 22. The lead 21 is connected to the brush 8, and the lead 22 is connected to the work-piece 14. The cut-out switch is provided with a contact member 23 and a contact 24 with which it is engageable. A spring 25 serves to keep the contact member 23 out of engagement with the contact 24, when the A. C. generator is not supplying welding current. One side of the direct current generator 10 is connected to the contact member 23 by means of a lead 26. The contact 24 is connected with one side of the field of the A. C. generator by means of a lead 27. The other side of the field is, of course, connected to the D. C. generator 10, by means of a lead 28. The resistance for the field of the A. C. generator is shown at 29 and it is connected across the leads 26 and 27, whereby a shunt is provided for the current flowing through the field 11 of the A. C. generator. When the contact member 23 is in the position shown in the drawings, no current will flow from it to the contact member 24, and the current provided by the D. C. generator 10 will be shunted across and through the resistance 29. This resistance is of such a strength that the current flowing through the field 11 of the A. C. generator will be materially reduced thereby reducing the voltage of the A. C. generator. This will occur only when the wire 15 is not in contact with the work-piece or when an arc is not being produced between these parts. When, however, the wire 15 is brought into contact with the work-piece 14, as in drawing an arc, the current flowing through the winding 20 of the cut-out switch 19 will cause the contact member 23 to be drawn against the contact 24, thus allowing current from the D. C. generator 10 to flow through these contact parts and thus cutting out the resistance 29. The full amount of current supplied by the D. C. generator will then flow through the field 11 of the A. C. generator and bring the voltage of the A. C. generator up to its normal.

The cut-out switch is shown in series with the ground wire 22 or work-piece, but it may be connected in series with the lead 17 running to the welding wire 15.

The form of cut-out switch just above described, is controlled by the amount of current flowing through the welding circuit, and it is obvious that the cut-out switch may be connected at any desired point in the welding circuit other than that shown in the drawings. The form of cut-out shown in Fig. 2 is designed to be actuated by means of the voltage generated by the A. C. generator. In this form of invention, 35 is the cut-out switch which is provided with a winding 36, a contact member 37 and a contact 38. A spring 39 is provided for maintaining the contact member 37 in engagement with the contact 38. In this form, the lead 26 is connected to the contact member 37 and the lead 27 is connected to the contact 38. The coil 36 of the cut-out switch is connected across the welding circuit at any desired point so that it will be affected by the voltage generated by the A. C. generator. For convenience of illustration, we have shown one side of this coil connected to the lead 21 by means of the lead 40, and the other side of the coil we have shown connected to the lead 17 by means of a lead 41. The contact member 37 is held normally in engagement with the contact 38 by means of the spring 39, thus cutting out the resistance 29 when the voltage of the generator is within the predetermined limit. When, however, the voltage reaches a point above that predetermined by the adjustment of the cut-out switch, as, for instance, when the workman breaks the arc, the voltage of the generator will immediately build up, and energize the core of the cut-out relay so as to attract the contact member 37 and draw it out of engagement with the contact 38, whereby the current to the generator field will be caused to flow through the resistance 29. When the voltage has been again reduced to the predetermined point at which the cut-out operates, the contact member 37 will be released, and the spring 39 will again draw it into engagement with the contact 38.

While we have shown and described our installation in connection with an alternating current generator, it is obvious that the same circuits and cut-out controls may be utilized in a direct current generator which has its field separately excited. Furthermore, both of the cut-out switches may be employed if desired in the same circuit. Moreover, in the drawings, we have shown an A. C. generator of the stationary field type, but we may, if desired, use an A. C. generator of the revolving field type. These and other modifications of the details herein shown and described may be made without departing from the spirit of our invention or the scope of the appended claims; and, we do not, therefore, wish to be limited to the exact embodiment herein shown and described, the form described being merely a preferred embodiment thereof.

Having thus described our invention, what we claim is:

1. In a portable electric arc welding apparatus, the combination with the work-piece and the welding circuit, of an A. C. arc welding generator of a frequency of 65 or over, and means for driving the generator.

2. In an electric arc welding apparatus, the combination with the work-piece and the welding circuit, of an arc welding generator, and means for reducing the flux density of the welding generator field when the welding circuit is open or the arc is broken whereby injurious shock to the operator is prevented.

3. In an electric arc welding apparatus, the combination with the work-piece and the welding circuit, of an arc welding generator, and automatic means for reducing the flow of current through the field coils of the generator when the welding circuit is open or the arc is broken whereby injurious shock to the operator is prevented.

4. In an electric arc welding apparatus, the combination with the work-piece and the welding circuit, of an arc welding generator, a D. C. generator for exciting the field of the welding generator, a resistance in series with the welding generator field, and automatic means for shunting the resistance whereby bare wire electrodes may be used.

5. In an electric arc welding apparatus, the combination with the work-piece and the welding circuit, of an arc welding generator, a D. C. generator for exciting the field of the welding generator, a resistance in series with the welding generator field, and a cut-out switch, having a core energized by the welding current and contact members in series with the field circuit and in parallel with the resistance, whereby the resistance may be shunted when the welding circuit is closed to permit the use of bare wire electrodes.

6. In an electric arc welding apparatus, the combination with the work-piece and the welding circuit, of an A. C. arc welding generator of a frequency of 65 or over, means for driving the generator, and means for reducing the flux density of the generator field when the welding circuit is opened or the arc is broken.

7. In an electric arc welding apparatus, the combination with the work-piece and the welding circuit, of an A. C. arc welding generator of a frequency of 65 or over, means for driving the generator, and automatic means for reducing the flow of current through the field coils of the generator when the welding circuit is opened or the arc is broken whereby injurious shock to the operator is prevented.

8. In an electric arc welding apparatus, the combination with the work-piece and the welding circuit, of an A. C. arc welding generator of a frequency of 65 or over, a D. C. generator for exciting the field of the welding generator, a resistance in series with the welding generator field, and automatic means for shunting the resistance.

9. In an electric arc welding apparatus, the combination with the work-piece and the welding circuit, of an A. C. arc welding generator of a frequency of 65 or over, a D. C. generator for exciting the field of the welding generator, a resistance in series with the welding generator field, and a cut-out switch adapted to shunt the resistance when the welding circuit is closed to permit the use of bare wire electrodes.

10. In an electric arc welding apparatus, the combination with the work-piece and the welding circuit, of an A. C. arc welding generator of a frequency of 65 or over, a D. C. generator for exciting the field of the welding generator, a resistance in series with the welding generator field, and a cut-out switch, having a core energized by the generator voltage and contact members in series with the field circuit and in parallel with the resistance, whereby the resistance may be shunted when the welding circuit is closed.

In testimony whereof, we have hereunto signed our names.

EDWARD S. HEBELER.
SYLVESTER C. SCHULENBERG.